United States Patent
Mihara et al.

(10) Patent No.: US 12,278,395 B2
(45) Date of Patent: Apr. 15, 2025

(54) OVERCURRENT PROTECTION ELEMENT AND BATTERY SYSTEM

(71) Applicant: SANYO Electric Co., Ltd., Osaka (JP)

(72) Inventors: Hiroyuki Mihara, Osaka (JP); Hiroaki Kita, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 743 days.

(21) Appl. No.: 17/439,858

(22) PCT Filed: Dec. 26, 2019

(86) PCT No.: PCT/JP2019/051125
§ 371 (c)(1),
(2) Date: Sep. 16, 2021

(87) PCT Pub. No.: WO2020/194967
PCT Pub. Date: Oct. 1, 2020

(65) Prior Publication Data
US 2022/0190451 A1 Jun. 16, 2022

(30) Foreign Application Priority Data
Mar. 27, 2019 (JP) .................. 2019-060108

(51) Int. Cl.
*H01M 50/507* (2021.01)
*H01M 10/48* (2006.01)
(Continued)

(52) U.S. Cl.
CPC ......... *H01M 50/507* (2021.01); *H01M 10/48* (2013.01); *H01M 50/227* (2021.01);
(Continued)

(58) Field of Classification Search
CPC .. H01M 50/507; H01M 50/50; H01M 50/227; H01M 50/262; H01M 50/569;
(Continued)

(56) References Cited

U.S. PATENT DOCUMENTS

| 2008/0116851 A1* | 5/2008 | Mori | H02J 7/00302 |
| | | | 320/136 |
| 2011/0149528 A1* | 6/2011 | Nelson | H05K 1/034 |
| | | | 174/268 |

(Continued)

FOREIGN PATENT DOCUMENTS

| JP | 2004-227797 | 8/2004 |
| JP | 2010-220377 | 9/2010 |

(Continued)

OTHER PUBLICATIONS

International Search Report of PCT application No. PCT/JP2019/051125 dated Feb. 25, 2020.

*Primary Examiner* — Jonathan G Leong
*Assistant Examiner* — John S Medley
(74) *Attorney, Agent, or Firm* — WHDA, LLP

(57) ABSTRACT

An overcurrent protection element includes: chip fuse; a printed circuit board configured by mounting chip fuse on a surface thereof; external connection part configured by being coupled to the printed circuit board; and insulating layer configured by being provided on the printed circuit board. The printed circuit board is provided with conductive parts on a surface of an insulating substrate. External connection part is electrically connected to the conductive parts of the printed circuit board. Chip fuse is electrically connected to the conductive parts, and chip fuse is connected to external connection part via the conductive parts.

13 Claims, 12 Drawing Sheets

(51) Int. Cl.
*H01M 50/227* (2021.01)
*H01M 50/262* (2021.01)
*H01M 50/284* (2021.01)
*H01M 50/50* (2021.01)
*H01M 50/569* (2021.01)
*H01M 50/583* (2021.01)
*H02H 7/18* (2006.01)

(52) U.S. Cl.
CPC ....... *H01M 50/262* (2021.01); *H01M 50/284* (2021.01); *H01M 50/50* (2021.01); *H01M 50/569* (2021.01); *H01M 50/583* (2021.01); *H02H 7/18* (2013.01)

(58) Field of Classification Search
CPC .. H01M 50/284; H01M 50/583; H01M 10/48; H02H 7/18
USPC .............................................................. 429/7
See application file for complete search history.

(56) References Cited

U.S. PATENT DOCUMENTS

| | | | | |
|---|---|---|---|---|
| 2015/0187529 | A1* | 7/2015 | Blattler | H05K 1/0373 |
| | | | | 337/297 |
| 2015/0194697 | A1* | 7/2015 | Hung | H01M 50/211 |
| | | | | 429/158 |
| 2015/0226810 | A1* | 8/2015 | Elian | G01R 31/396 |
| | | | | 324/426 |
| 2015/0333547 | A1* | 11/2015 | Na | H02H 7/18 |
| | | | | 361/93.1 |
| 2018/0219204 | A1* | 8/2018 | Takase | H01M 10/48 |
| 2024/0014501 | A1* | 1/2024 | Ikeda | H01M 50/284 |

FOREIGN PATENT DOCUMENTS

| | | | | |
|---|---|---|---|---|
| JP | 2015-035281 | | 2/2015 | |
| JP | 2018018835 A | * | 2/2018 | ............ H01H 85/08 |
| WO | 2017/018213 | | 2/2017 | |
| WO | WO-2017018213 A1 | * | 2/2017 | ............ H01M 10/48 |
| WO | WO-2020137983 A1 | * | 7/2020 | ............ G01R 15/00 |

* cited by examiner (1)

(2)

(3)

(4)

(1)

(2)

OVERCURRENT PROTECTION ELEMENT AND BATTERY SYSTEM

CROSS-REFERENCE TO RELATED APPLICATIONS

This application is a U.S. national stage application of the PCT International Application No. PCT/JP2019/051125 filed on Dec. 26, 2019, which claims the benefit of foreign priority of Japanese patent application No. 2019-060108 filed on Mar. 27, 2019, the contents all of which are incorporated herein by reference.

TECHNICAL FIELD

The present invention relates to an overcurrent protection element including a fuse that is molten by receiving a flow of an excessive current, and to a battery system including this overcurrent protection element.

BACKGROUND ART

Fuses as overcurrent protection elements each of which is molten by receiving a flow of an overcurrent are used for a variety of purposes. For example, such fuses are used as overcurrent protection elements in current detection lines of a battery system in which a plurality of batteries are connected in series to one another. This battery system detects the respective battery voltages to control charge/discharge of the batteries, and thereby protects the batteries to ensure safety of the system itself. Fuses to be used as overcurrent protection elements for this purpose are connected to voltage detection lines which connect batteries constituting the battery system and a voltage detection circuit that detects the respective battery voltages to each other. The voltage detection circuit detects the respective battery voltages via the voltage detection lines. When the battery voltages exceed a set range, the voltage detection circuit restricts currents to be charged/discharged, or prohibits the charge/discharge, further, controls the respective battery voltages to be equalized to one another, and thereby protects the batteries to ensure safety. An extremely large output is instantaneously required for a battery system to be used for a power source device that runs a vehicle or for an interrupted power source of a server. Accordingly, the battery system connects a large number of batteries to one another to increase an output voltage. For this battery system, it is important to surely detect a large number of battery voltages, and to control the charge/discharge to ensure safety.

The battery system that detects the respective battery voltages and controls charge/discharge currents connects the respective electrode terminals and the voltage detection circuit to each other by the voltage detection lines. Since the battery system detects all of the battery voltages, the number of voltage detection lines is increased in proportion to the number of batteries. For example, a battery system that connects 20 batteries in series to one another needs to connect the respective batteries to the voltage detection circuit by 21 voltage detection lines. Since the battery system arranges a large number of the voltage detection lines in a narrow space, it is important to miniaturize the overcurrent protection elements. Moreover, each of the voltage detection lines has one end connected to the electrode terminal of the battery. Accordingly, when an outer sheath of the voltage detection line is damaged, or a short circuit occurs in an erroneous assembly process, an overcurrent flows therethrough to cause impairment of safety. In order to prevent such a harmful effect, a power source device has been developed, in which fuses are provided as overcurrent protection elements in the respective voltage detection lines. (See PTL 1)

CITATION LIST

Patent Literature

PTL 1: Unexamined Japanese Patent Publication No. 2010-220377

SUMMARY OF THE INVENTION

In each overcurrent protection element to be connected in the middle of the voltage detection line, lead wires are connected to wire materials on both ends of a lead fuse via crimp terminals with a crimp structure, and both of the fuse and the crimp terminals are insulated by being coated with heat shrinkable tubes. In the fuse with this structure, the lead wires are connected to the fuse by the crimp terminals, and tip ends of the lead wires are connected to the electrode terminal of the battery and the voltage detection circuit by a method such as soldering. Since this fuse has both ends connected with the crimp terminals with the crimp structure and is coated with the heat shrinkable tubes, the fuse becomes so thick that cannot be arranged compactly. Therefore, it takes time to arrange a large number of the voltage detection lines to be wired in a narrow region of the system. Moreover, the voltage detection lines are connected by means of the crimp structure. Accordingly, there is a harmful effect that a connection failure on these portions cannot be completely eliminated for a long period of time. A contact failure of the fuses becomes substantially equivalent to a molten state of the fuses. Accordingly, in a state where the fuses are used for the voltage detection lines, the contact failure causes a significantly harmful effect in all usage environments, the harmful effect including that the battery voltages cannot be detected stably and surely.

The present invention has been developed aiming to solve the above-described drawbacks inherent in the conventional fuses. It is an important object of the present invention to provide an overcurrent protection element capable of enhancing reliability thereof by suppressing the contact failure at the time of connection while simplifying connection work, and to provide a battery system including the overcurrent protection element.

An overcurrent protection element according to a certain aspect of the present invention includes: chip fuse 11; printed circuit board 12 configured by mounting chip fuse 11 on a surface thereof; external connection part 13 configured by being coupled to printed circuit board 12; and insulating layer 15 configured by being provided on printed circuit board 12. Printed circuit board 12 is provided with conductive parts 12B on a surface of insulating substrate 12A, 12C. External connection part 13 is electrically connected to conductive parts 12B of printed circuit board 12. Chip fuse 11 is electrically connected to conductive parts 12B, and chip fuse 11 is connected to external connection part 13 via conductive parts 12B.

A battery system according to another aspect of the present invention includes: a plurality of battery cells 1; metal plate bus bars 3 configured by being fixed to electrode terminals 2 of battery cells 1 and connecting battery cells 1 to one another; and voltage detection circuit 5 configured by being connected to metal plate bus bars 3 via voltage detection lines 4 including overcurrent protection elements 10, 20, 30, 40, 50. Each of overcurrent protection elements 10, 20, 30, 40, 50 includes: chip fuse 11; printed circuit board 12 configured by mounting chip fuse 11 on a surface thereof; external connection part 13 configured by being coupled to printed circuit board 12; and insulating layer 15 configured by being provided on printed circuit board 12. Printed circuit board 12 is provided with conductive parts 12B on a surface of insulating substrate 12A, 12C, and external connection part 13 is electrically connected to conductive parts 12B of printed circuit board 12. Chip fuse 11 is electrically connected to conductive parts 12B. Chip fuse 11 is connected to external connection part 13 via conductive parts 12B, and external connection part 13 is connected to voltage detection line 4.

The overcurrent protection element and the battery system according to the present invention have a feature of simplifying the connection work of the overcurrent protection element, and enhancing reliability by suppressing the contact failure at the time of connection.

DESCRIPTION OF EMBODIMENTS

Figure 1:
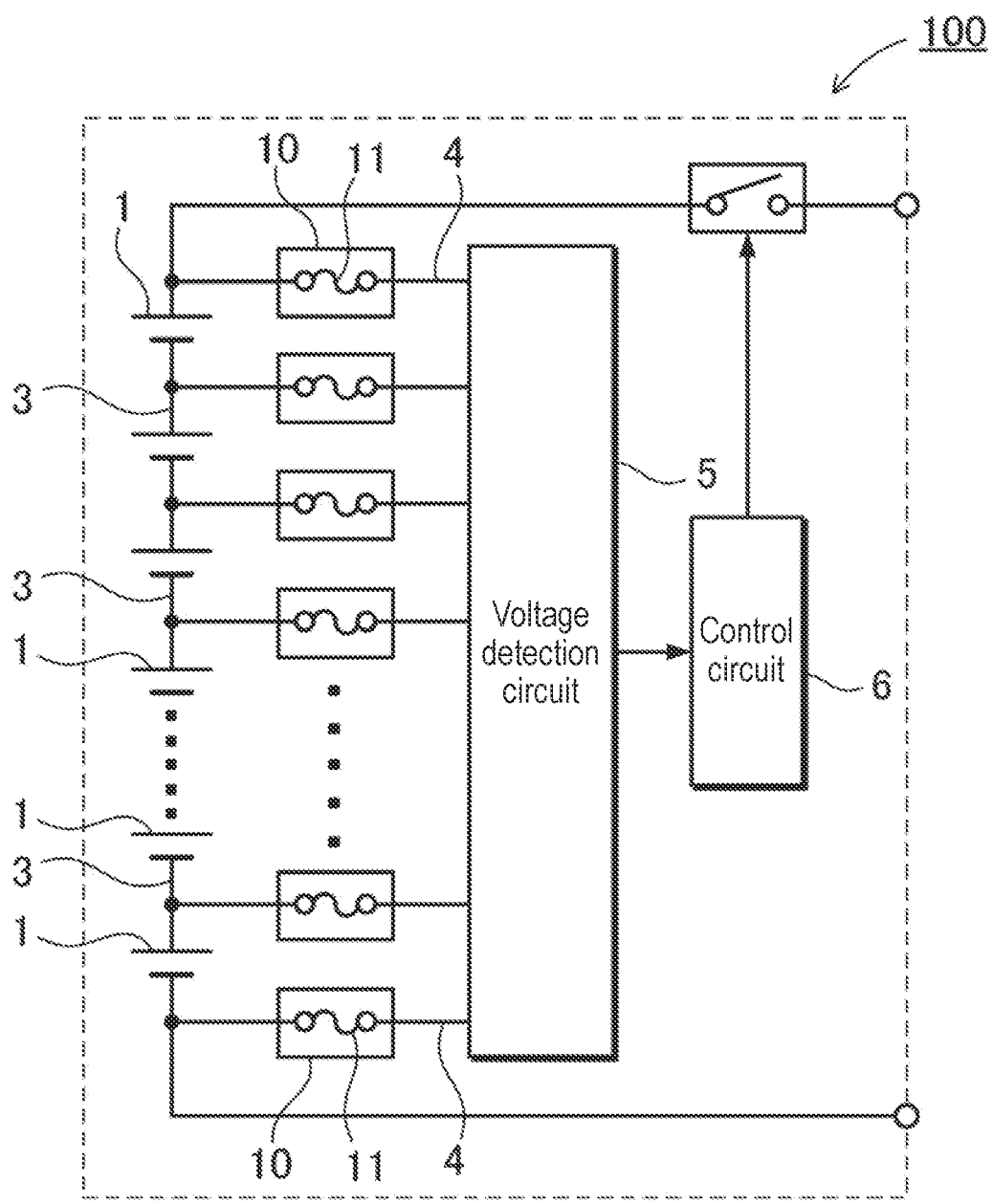
FIG. 1 is a circuit diagram of a battery system according to one exemplary embodiment of present invention.

Hereinafter, the present invention will be described in detail with reference to the drawings. In the following description, terms (for example, "top", "bottom", and other terms including those terms) indicating specific directions or positions are used as necessary; however, the use of those terms is for facilitating the understanding of the invention referring to the drawings, and the technical scope of the present invention is not limited by the meanings of the terms. Moreover, portions having the same reference numerals, which appear in a plurality of drawings, indicate the same or equivalent portions or members.

Furthermore, the exemplary embodiments described below illustrate specific examples of the technical idea of the present invention, and do not limit the present invention to the following. Further, dimensions, materials, shapes, relative arrangements and the like of components described below are not intended to limit the scope of the present invention only thereto unless specifically stated, and are intended to be merely exemplified. Moreover, contents described in one exemplary embodiment and one example are also applicable to other exemplary embodiments and examples. Furthermore, sizes, positional relationships and the like of members illustrated in the drawings may sometimes be exaggerated in order to clarify the explanation.

An overcurrent protection element of a first invention of the present invention includes: a chip fuse; a printed circuit board configured by mounting the chip fuse on a surface of the printed circuit board; an external connection part configured by being coupled to the printed circuit board; and an insulating layer configured by being provided on the printed circuit board, wherein the printed circuit board is provided with conductive parts on a surface of an insulating substrate, the external connection part is electrically connected to the conductive part of the printed circuit board, the chip fuse is electrically connected to the conductive part, and the chip fuse is connected to the external connection part via the conductive part.

The above-described overcurrent protection element does not use a crimp terminal with a crimp structure or a heat shrinkable tube, but mounts the chip fuse on the surface of the printed circuit board and insulates the surface thereof. Moreover, the overcurrent protection element is provided with the external connection part on the conductive parts of the printed circuit board, and this external connection part can be electrically connected to the voltage detection line or the like of the battery system. Accordingly, the overcurrent protection element can simplify the assembly work by being effortlessly disposed in a narrow space, and in addition, does not need to use the crimp terminal with the crimp structure. Accordingly, the overcurrent protection element has a feature of being able to enhance reliability by suppressing the contact failure at the time of connection, which occurs in the crimp terminal and the like with an elapse of time. Moreover, the chip fuse can be mounted on the printed circuit board, the external connection part can be electrically connected to the conductive parts of the printed circuit board, and the voltage detection line can be connected to the external connection part. Accordingly, while using the chip fuse that is small, the voltage detection line can be electrically connected thereto easily, and in addition surely and stably. Moreover, the chip fuse can be protected by the printed circuit board and the insulating layer. The overcurrent protection element also achieves such features as described above.

In an overcurrent protection element of a second invention of the present invention, the insulating substrate is a planar hard substrate. The hard substrate can stably couple the external connection part thereto.

In an overcurrent protection element of a third invention of the present invention, the insulating substrate is a flexible substrate with flexibility. The flexible substrate can be effortlessly disposed in a narrow space.

In an overcurrent protection element of a fourth invention of the present invention, the insulating layer is an insulating plastic molded body configured by being coupled to the surface of the printed circuit board. The above-described overcurrent protection element has a feature of being able to protect the printed circuit board, the chip fuse and the external connection part by the insulating layer of the insulating plastic molded body.

In an overcurrent protection element of a fifth invention of the present invention, the external connection part includes a pair of first external connection part and a second external connection part, and the first external connection part is made of a metal plate.

In an overcurrent protection element of a sixth invention of the present invention, the metal plate has a shape of a plate to be coupled to a metal plate bus bar configured by being fixed to an electrode terminal of each of batteries constituting a battery system.

In an overcurrent protection element of a seventh invention of the present invention, the second external connection part includes a metal plate or a lead wire, which is configured by being soldered to the conductive part of the printed circuit board.

In an overcurrent protection element of an eighth invention of the present invention, the second external connection part includes a metal plate configured by being soldered to the conductive part of the printed circuit board, and a lead wire configured by being connected to the metal plate.

In an overcurrent protection element of a ninth invention of the present invention, the insulating plastic molded body has an opening window that exposes the chip fuse, and the opening window is covered with an insulating material.

In an overcurrent protection element of a tenth invention of the present invention, the insulating plastic molded body has a holding portion of the external connection part. The above-described overcurrent protection element has a feature of being able to reinforce the coupling portion of the printed circuit board and the external connection part by the insulating plastic molded body and increase coupling strength of both.

In an overcurrent protection element of an eleventh invention of the present invention, the insulating plastic molded body is coupled to the printed circuit board by a locking structure.

In an overcurrent protection element of a twelfth invention of the present invention, the insulating plastic molded body is fixed by sandwiching both surfaces of the printed circuit board.

In an overcurrent protection element of a thirteenth invention of the present invention, the external connection part includes a connection part to be connected to a voltage detection line that detects a voltage of each of the batteries constituting the battery system configured by connecting the respective batteries in series to one another.

A battery system of a fourteenth invention of the present invention includes: a plurality of battery cells; metal plate bus bars configured by being fixed to electrode terminals of the battery cells and connecting the battery cells to one another; and a voltage detection circuit configured by being connected to the metal plate bus bars via voltage detection lines including overcurrent protection elements. An overcurrent protection element includes: a chip fuse; a printed circuit board configured by mounting the chip fuse on a surface of the printed circuit board; an external connection part configured by being coupled to the printed circuit board; and an insulating layer configured by being provided on the printed circuit board. The printed circuit board is provided with conductive parts on a surface of an insulating substrate, the external connection part is electrically connected to the conductive part of the printed circuit board, the chip fuse is electrically connected to the conductive part, the chip fuse is connected to the external connection part via the conductive part, and the external connection part is connected to the voltage detection line.

In a battery system of a fifteenth invention of the present invention, the insulating substrate is a planar hard substrate or a flexible substrate with flexibility.

In a battery system of a sixteenth invention of the present invention, the insulating layer is an insulating plastic molded body configured by being coupled to a surface of the printed circuit board.

In a battery system of a seventeenth invention of the present invention, the insulating layer is an insulating plastic molded body configured by holding the external connection part.

Exemplary Embodiments

Battery system 100 illustrated in a circuit diagram of FIG. 1 includes: a plurality of battery cells 1; and voltage detection circuit 5 that detects voltages of respective battery cells 1. By respective battery voltages detected by voltage detection circuit 5, battery system 100 protects the batteries by controlling charge/discharge currents, and ensures safety. This battery system 100 is mainly suitable for a large-power power source such as a power source device that supplies power to a motor that runs a vehicle, or a power source device of a server, or a power source device for a power storage device that stores generated power of a solar cell panel, or a power source device for a power storage device that stores midnight power.

Battery system 100 includes control circuit 6 that controls charge/discharge by the battery voltages detected by the voltage detection circuit 5. When any of the battery voltages reaches a voltage exceeding a set value, control circuit 6 cuts off or reduces a charging current and prevents overcharge of the battery, and when the battery voltage falls below the set value on the contrary, control circuit 6 prohibits discharge or reduces a discharging current, and protects the battery from overdischarge. Moreover, when the battery voltages get imbalanced, a specific battery is charged or discharged to equalize the battery voltages to one another, and such an imbalance is suppressed.

Figure 2:
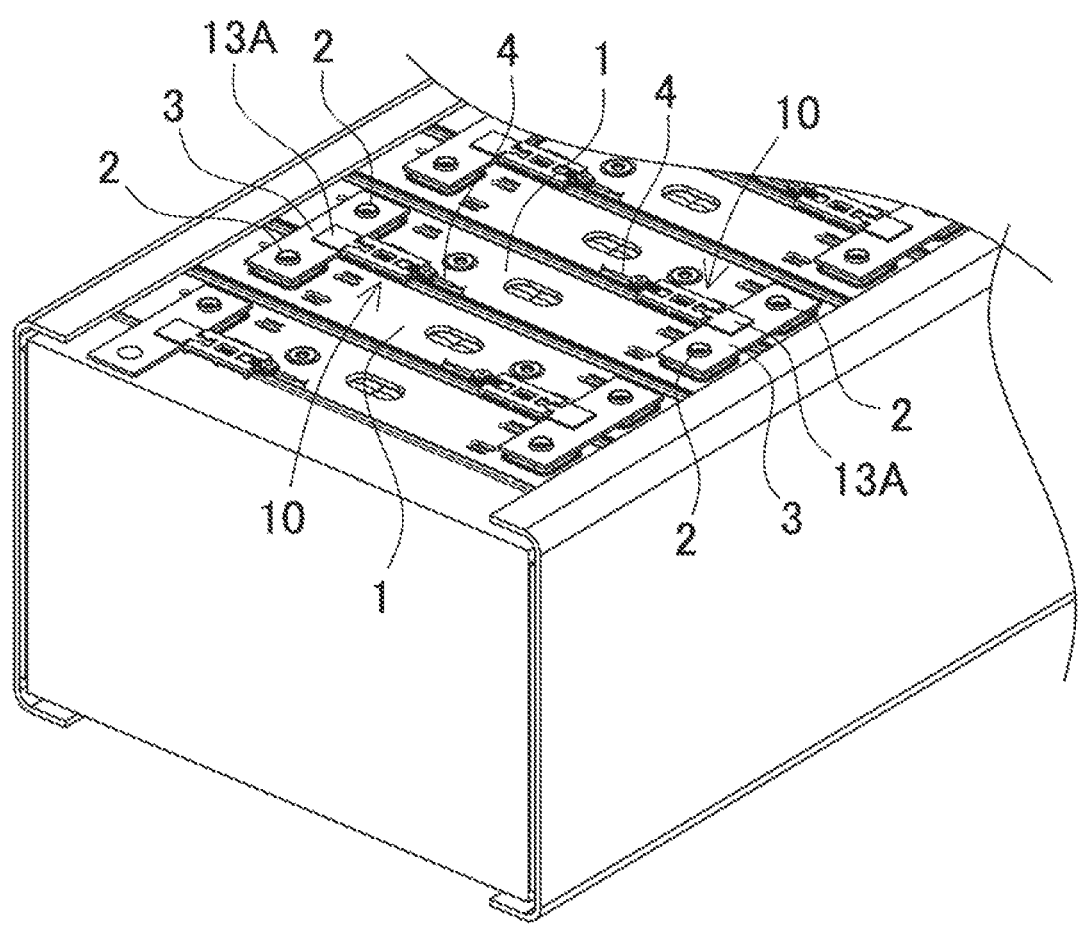
FIG. 2 is an enlarged perspective view of the battery system according to the exemplary embodiment of present invention.

As illustrated in an enlarged perspective view in FIG. 2, battery system 100 fixes metal plate bus bars 3 to electrode terminals 2, and connects battery cells 1 in series or parallel to one another. Voltage detection circuit 5 is connected to metal plate bus bars 3 via voltage detection lines 4, and detects the respective battery voltages. Each of voltage detection lines 4 connects overcurrent protection element 10 to the middle thereof. Each of overcurrent protection elements 10 is connected to each of voltage detection lines 4. For example, in an assembly process, overcurrent protection element 10 protects the battery from an excessive short circuit current that flows due to a short circuit of voltage detection line 4, which is caused by an erroneous operation of an operator or a breakage of a sheath. Moreover, overcurrent protection element 10 ensures safety.

Specific examples of overcurrent protection elements 10, 20, 30 are illustrated in FIGS. 3 to 7. Each of overcurrent protection elements 10, 20, 30 in FIGS. 3 to 7 includes: chip fuse 11 that is molten by an overcurrent; printed circuit board 12 that mounts chip fuse 11 on a surface thereof; external connection part 13 coupled to printed circuit board 12; and insulating layer 15 provided on printed circuit board 12.

In order that chip fuse 11 can be mounted on the surface of printed circuit board 12, and can subject terminals on both ends thereof to reflow soldering, chip fuse 11 has a rectangular parallelepiped outer shape, provides terminals on both end portions thereof, in which metal wire fuses to be molten by a set current are arranged and both ends of the fuse are connected to the terminals.

Printed circuit board 12 is provided with conductive parts 12B by adhering copper foil on a surface of insulating substrate 12A. Insulating substrate 12A is a hard substrate or a flexible substrate with flexibility, which is formed by molding, into a flat shape, an epoxy or phenol resin in which reinforcement fiber is embedded. The hard substrate can stably couple external connection part 13 thereto, and the flexible substrate can be disposed effortlessly in a narrow space.

External connection part 13 is a pair of terminals electrically connected to conductive parts 12B of printed circuit board 12, and includes first external connection part 13A and second external connection part 13B. In each of overcurrent protection elements 10, 20, 30 illustrated in FIGS. 3 to 7, first external connection part 13A includes conductive metal plate 14. Each of metal plates 14A, 14C illustrated in the drawings has an outer shape provided with protrusion 14a that connects to conductive part 12B. Protrusion 14a is laminated on the surface of printed circuit board 12, and is electrically connected to conductive part 12B by soldering. Each of metal plates 14A, 14C has protrusion 14a soldered to conductive part 12B and coupled to a fixed position of printed circuit board 12.

As illustrated in FIG. 2, first external connection part 13A of metal plate 14 is fixed and electrically connected to each of metal plate bus bars 3 of battery system 100. Metal plate bus Bus-bar 3 is a metal plate that connects battery cells 1 constituting battery system 100 in series or parallel to each other. Overcurrent protection element 10 to be fixed by laminating first external connection part 13A to metal plate bus bar 3 is fixed to a fixed position of battery cell 1 surely and stably, and further, is electrically connected thereto stably with a small electrical resistance. First external connection part 13A to be fixed to metal plate bus bar 3 is fixed thereto by welding, or is fixed thereto by screwing. Moreover, first external connection part 13A can also be fixed to metal plate bus bar 3 by other methods such as using a crimp structure.

Figure 3:
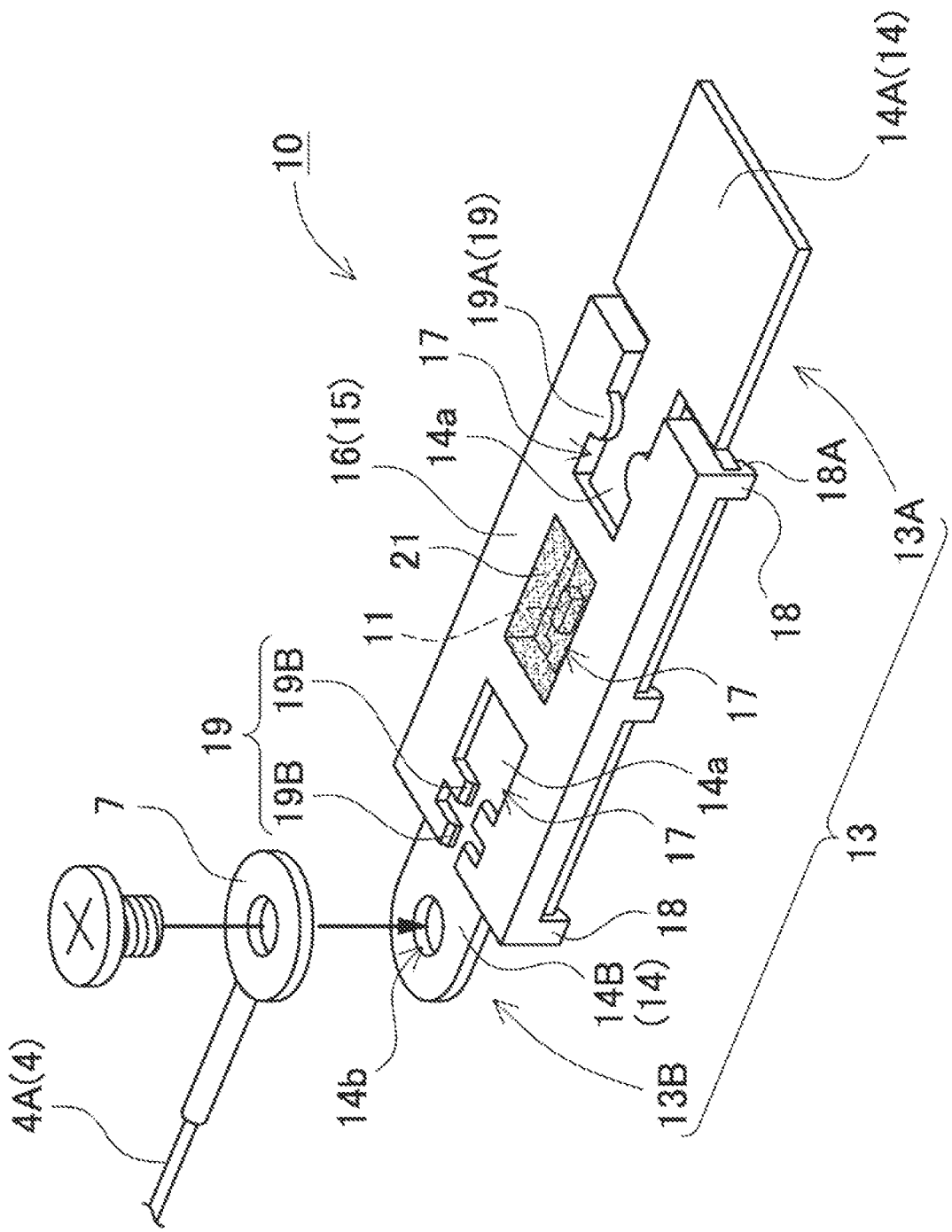
FIG. 3 is a perspective view of an overcurrent protection element according to the exemplary embodiment of the present invention.
Figure 4:
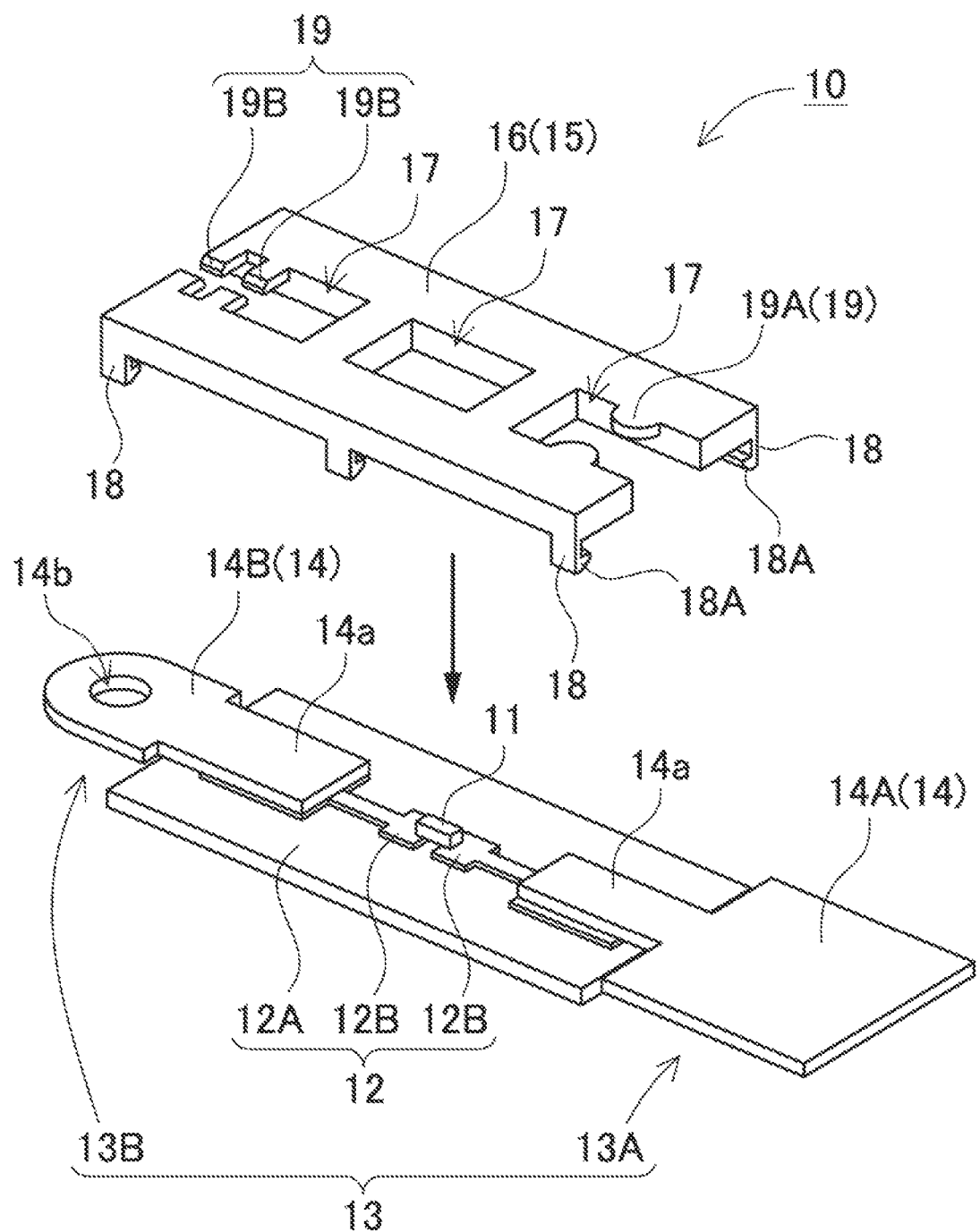
FIG. 4 is an exploded perspective view of the overcurrent protection element illustrated in FIG. 3.
Figure 5:
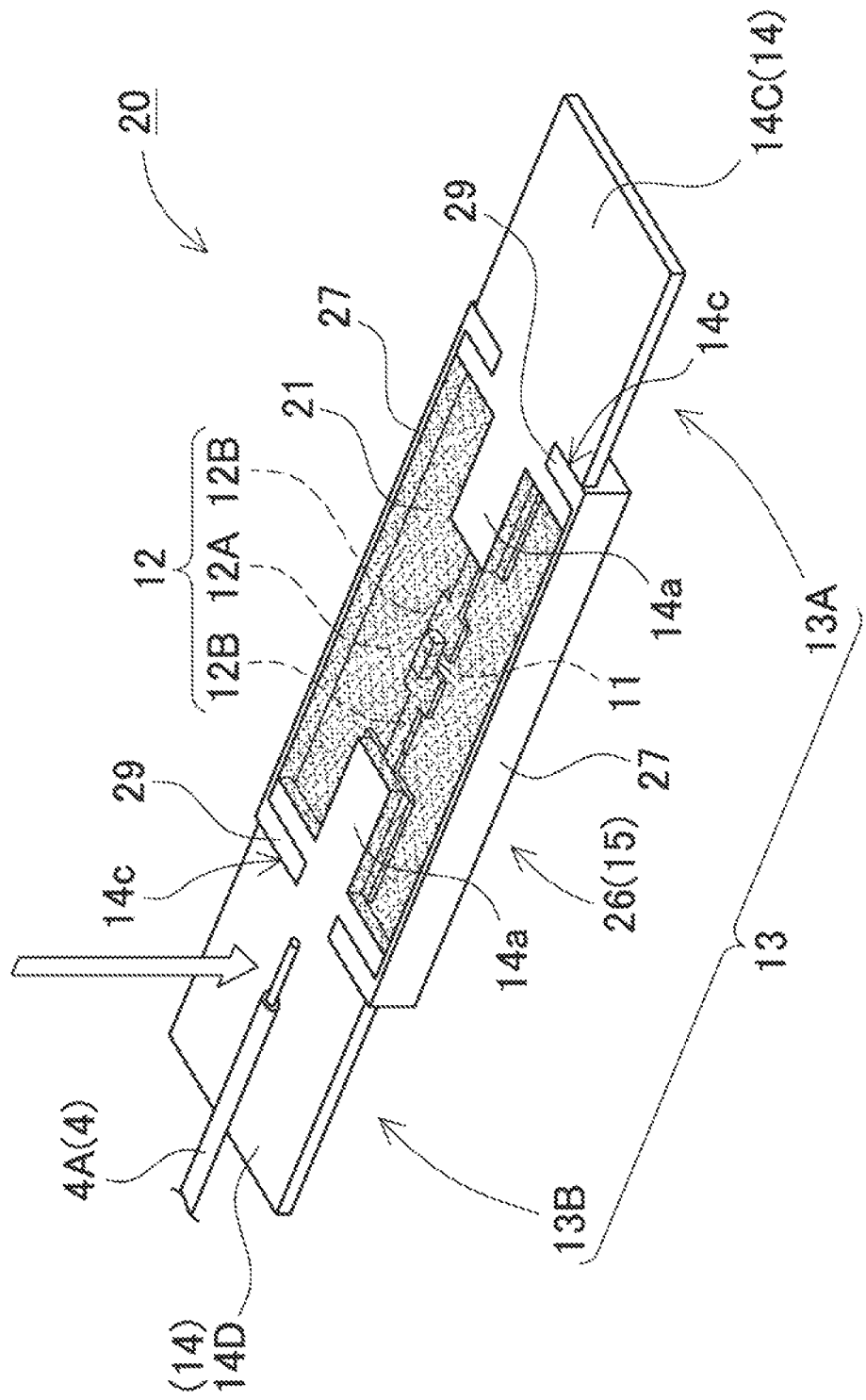
FIG. 5 is a perspective view of an overcurrent protection element according to another exemplary embodiment of the present invention.

Furthermore, in each of overcurrent protection elements 10, 20 in FIGS. 3 to 6, second external connection part 13B also includes conductive metal plate 14. Second external connection part 13B that is each of metal plates 14B, 14D also has an outer shape with protrusion 14a, and has protrusion 14a laminated on printed circuit board 12 and fixed thereto by soldering. Metal plate 14B of second external connection part 13B illustrated in FIG. 3 is provided with through hole 14b. Second external connection part 13B that is metal plate 14B with through hole 14b can screw and fix thereto connection terminal 7 provided on an end of lead wire 4A of voltage detection line 4. Moreover, as illustrated in FIG. 5, second external connection part 13B of metal plate 14D can electrically connect lead wire 4A of voltage detection line 4 to a surface thereof by laser welding or ultrasonic connection. Furthermore, in overcurrent protection element 30, as illustrated in FIG. 7, a part of conductive part 12B provided on the surface of printed circuit board 12 is formed as second external connection part 13B, to which lead wire 4A of voltage detection line 4 can also be directly electrically connected by soldering.

In each of overcurrent protection elements 10, 20, 30 illustrated in FIGS. 3 to 7, each of metal plates 14A, 14C as first external connection parts 13A and metal plate 14D as second external connection part 13B are set to have the same width as a width of rectangular printed circuit board 12, and are arranged on ends in a longer direction of printed circuit board 12. Thus, each of overcurrent protection elements 10, 20, 30 is formed into a shape in which each of metal plates 14 does not protrude to both sides of printed circuit board 12. Each of these overcurrent protection elements 10, 20, 30 has a feature of being able to be made compact and effortlessly arranged in a narrow space of battery system 100 while increasing the width of metal plate 14 to have an outer shape that enables sure and stable connection to metal plate bus bar 3 and voltage detection line 4. Moreover, overcurrent protection element 10 illustrated in FIGS. 3 and 4 reduces a width of metal plate 14B, which is second external connection part 13B, more than the width of rectangular printed circuit board 12, and is formed into a shape in which metal plate 14 does not protrude to both sides of printed circuit board 12. Though not illustrated, the overcurrent protection element can also be formed into a more compact outer shape by reducing the width of the metal plate, which is the first external connection part, more than that of the printed circuit board.

Moreover, each of overcurrent protection elements 10, 20, 30 in FIGS. 3 to 7 uses insulating plastic molded body 16, 26 as insulating layer 15, and insulates the surface of printed circuit board 12. However, each of overcurrent protection elements 10, 20, 30 of the present invention does not necessarily limit insulating layer 15 to insulating plastic molded body 16, 26. For example, though not illustrated, a potting resin is applied to the surface of printed circuit board 12 to provide insulating layer 15. As described above, each of overcurrent protection elements 10, 20, 30 can adopt all other structures capable of laminating such an insulating material on the surface of printed circuit board 12 and insulating the surface of the substrate.

Each of insulating plastic molded bodies 16, 26 is molded into a shape substantially equal to the outer shape of rectangular printed circuit board 12, and is laminated on the surface of printed circuit board 12 and insulates the surface of printed circuit board 12. Insulating layer 15 as each of insulating plastic molded bodies 16, 26 is laminated on and fixed to the surface of printed circuit board 12, and reinforces printed circuit board 12. Each of insulating plastic molded bodies 16, 26 is fixed to printed circuit board 12 by a locking structure, or is fixed thereto by sandwiching the printed circuit board 12 from both surfaces, or alternatively is fixed thereto by being adhered to the surface of printed circuit board 12.

As illustrated in FIG. 4, insulating plastic molded body 16 to be fixed to printed circuit board 12 by the locking structure is provided with locking hooks 18 on both sides thereof by integral molding. Each of locking hooks 18 has, in an inside thereof, a locking portion 18A capable of locking printed circuit board 12. This insulating plastic molded body 16 locks a lower surface of printed circuit board 12 by locking hooks 18, and is fixed to printed circuit board 12.

Figure 8:
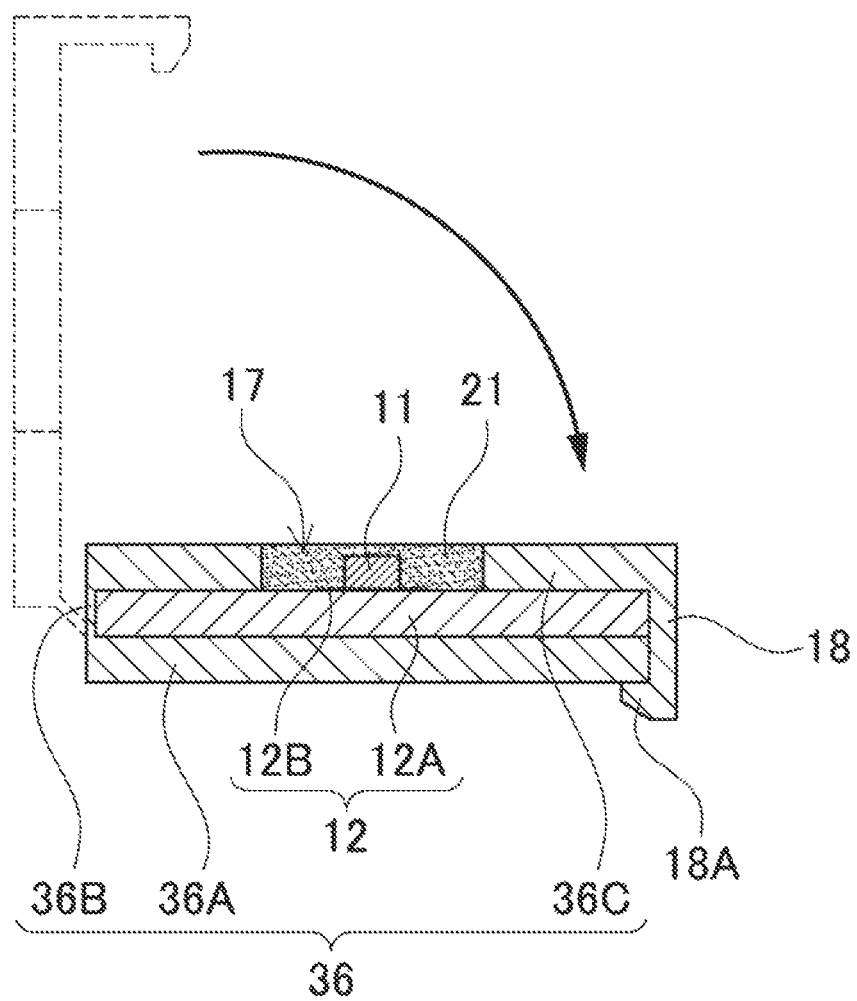
FIG. 8 is a cross-sectional view illustrating another example of an insulating plastic molded body.

Moreover, FIG. 8 illustrates an example of insulating plastic molded body 36 to be fixed by sandwiching printed circuit board 12. Insulating plastic molded body 36 in FIG. 8 couples back cover 36A to be disposed on a back surface of printed circuit board 12 and insulating cover 36B that insulates the surface thereof to each other by bendable hinge portion 36C. Hinge portion 36C is molded to be thin so as to be bendable, and is molded integrally with back cover 36A and insulating cover 36B. Moreover, insulating plastic molded body 36 includes locking hook 18 on a tip end of insulating cover 36B, locks locking hook 18 on back cover 36A in a state where the surface of printed circuit board 12 is covered with back cover 36A, hinge portion 36C and insulating cover 36B, and is fixed to printed circuit board 12.

Each of insulating plastic molded bodies 16, 36 illustrated in FIGS. 3, 4, 7 and 8 is provided with opening windows 17 which guide chip fuse 11 and external connection part 13 which are mounted on the surface of printed circuit board 12. Each of insulating plastic molded bodies 16, 36 with this shape can guide such members, which are mounted on the surface of printed circuit board 12 and protrude therefrom, to insides of opening windows 17. Accordingly, each of insulating plastic molded bodies 16, 36 can be thin as a whole and insulate the surface of printed circuit board 12. Opening windows 17 are filled with insulating material 21. That is, surfaces of chip fuse 11 and external connection part 13 which are arranged inside are covered with insulating material 21 and are insulated.

Moreover, on insulating plastic molded body 16, each of overcurrent protection elements 10, 30 illustrated in FIGS. 3, 4 and 7 is provided with holding portion 19 of external connection part 13. Holding portion 19 is holding protrusions 19A, 19B which protrude toward the surface of external connection part 13. Holding protrusions 19A, 19B sandwich, with printed circuit board 12, metal plates 14A, 14B as external connection part 13, and hold metal plates 14A, 14B at fixed positions. Holding portion 19 is provided on insulating plastic molded body 16 by being molded integrally therewith, is located on surfaces of metal plates 14A, 14B, and prevents protrusions 14a of metal plates 14A, 14B from being peeled off from printed circuit board 12.

Moreover, without providing the metal plate on second external connection part 13B, overcurrent protection element 30 illustrated in FIG. 7 uses a part of conductive part 12B, which is provided on the surface of printed circuit board 12, as second external connection part 13B, and directly solders lead wire 4A of voltage detection line 4 thereto. Then, overcurrent protection element 30 causes holding protrusions 19B, which are molded integrally with insulating plastic molded body 16, to function as holding portion 19 that holds lead wire 4A at a fixed position. Thus, lead wire 4A to be soldered to conductive part 12B is effectively prevented from being peeled off.

Figure 6:
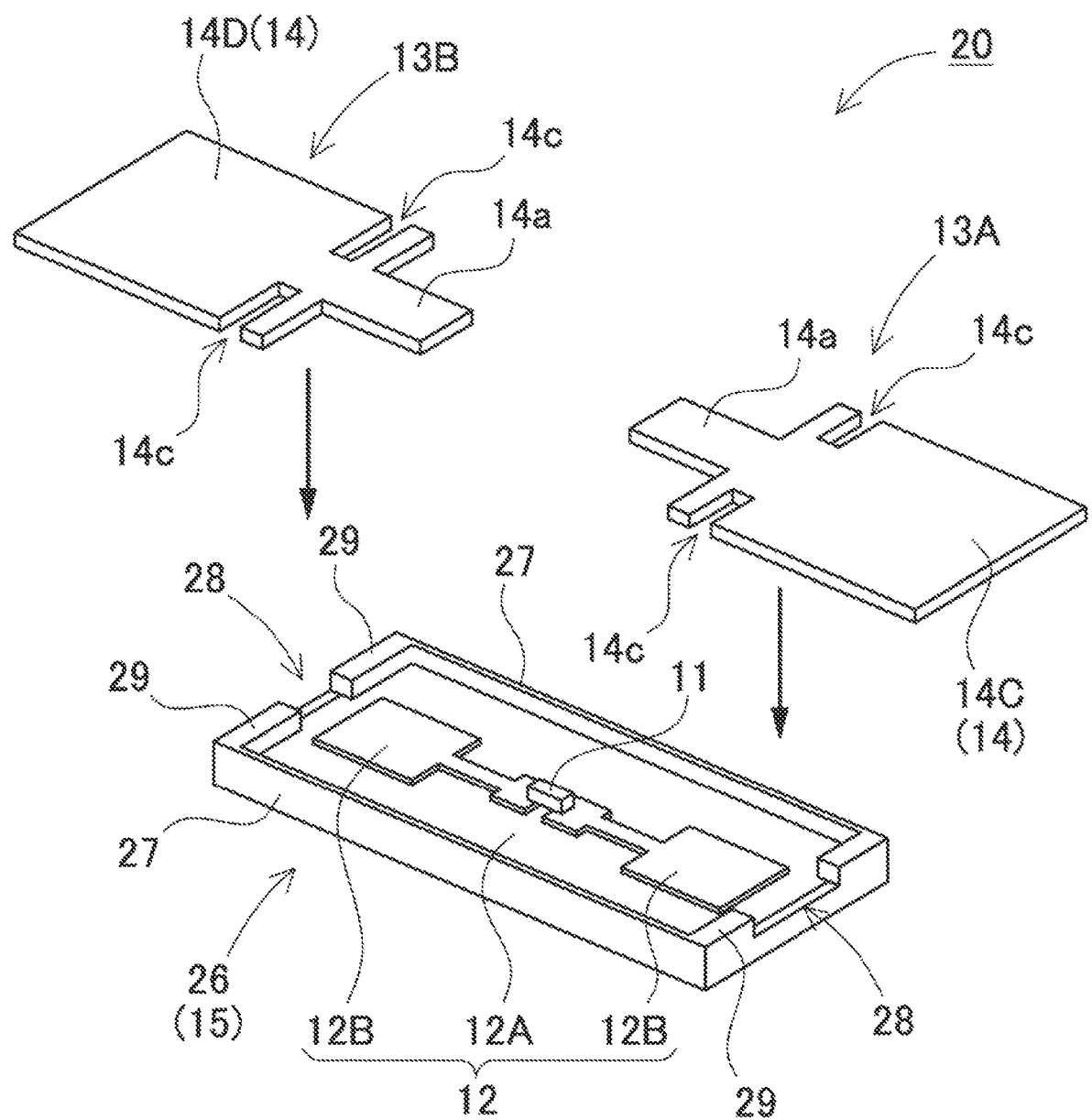
FIG. 6 is a perspective view of the overcurrent protection element according to another exemplary embodiment of the present invention.
Figure 7:
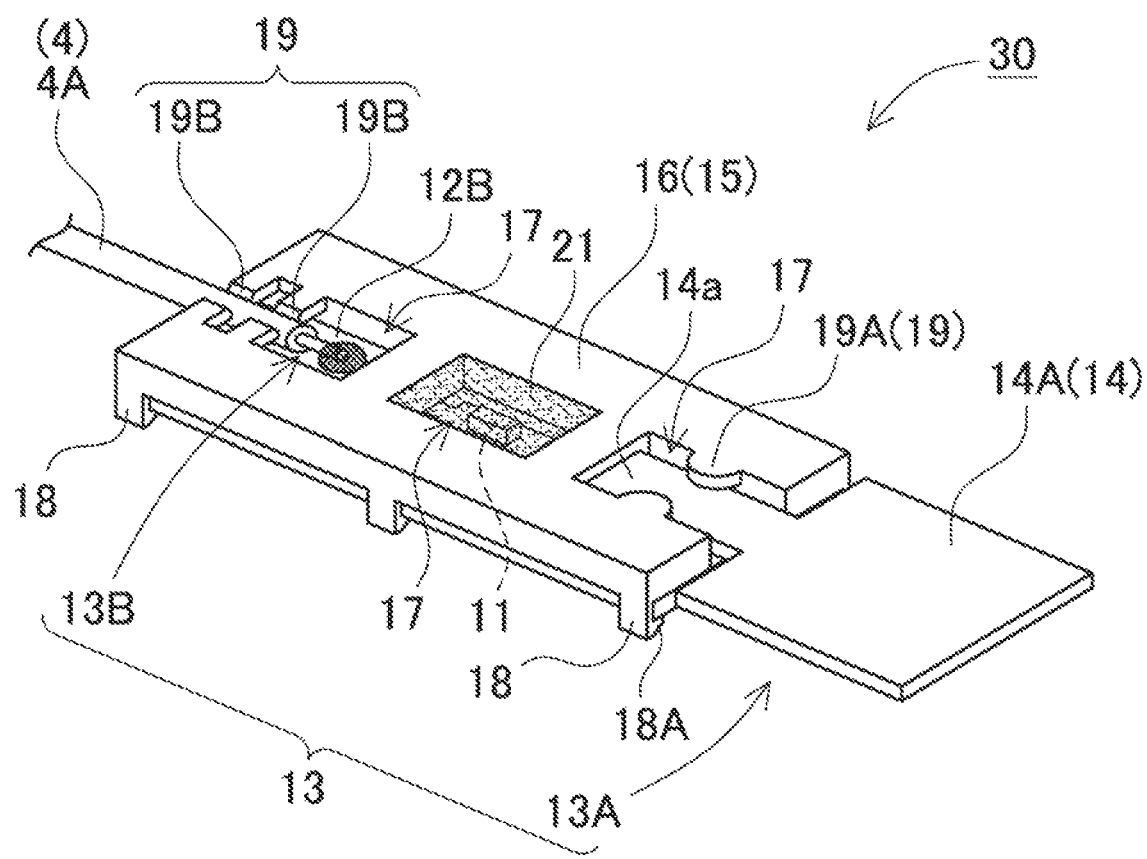
FIG. 7 is an exploded perspective view of the overcurrent protection element illustrated in FIG. 6.

Moreover, insulating plastic molded body 26 in FIGS. 5 and 6 is formed into a box shape in which an upper portion is opened, and is made capable of housing printed circuit board 12 inside thereof. This insulating plastic molded body 26 includes peripheral wall 27 that goes along an outer periphery of the printed circuit board, and the peripheral wall 27 being made higher than a thickness of printed circuit board 12. Moreover, insulating plastic molded body 26 in FIG. 6 partially cuts off both ends of peripheral wall 27, and forms positioning recesses 28 which guide metal plates 14C, 14D as external connection part 13. Insulating plastic molded body 26 in the drawing defines portions of peripheral wall 27, which are located on both sides of positioning recesses 28, as fitting protrusions 29 which are guided to fitting recesses 14c provided on both sides of metal plates 14C, 14D. This insulating plastic molded body 26 fixes printed circuit board 12, which is housed inside thereof, to the fixed position by such a locking structure or adhesion. In addition, insulating plastic molded body 26 is fits fitting protrusions 29 on both sides of positioning recesses 28 to fitting recesses 14c provided on both sides of metal plates 14C, 14D. Thus, insulating plastic molded body 26 couples metal plates 14C, 14D as external connection part 13 to fixed positions. Thus, while being accurately positioned, protrusions 14a of metal plates 14C, 14D can be laminated and soldered to conductive parts 12B provided on the surface of printed circuit board 12.

Moreover, overcurrent protection element 20 in FIGS. 5 and 6 fills the inside of peripheral wall 27 with insulating material 21 such as a potting resin, in which the inside is also the surface of printed circuit board 12 housed in insulating plastic molded body 26. Then, overcurrent protection element 20 coats and insulates the surfaces of chip fuse 11 and printed circuit board 12, which are to be arranged in an inner portion thereof.

Figure 9:
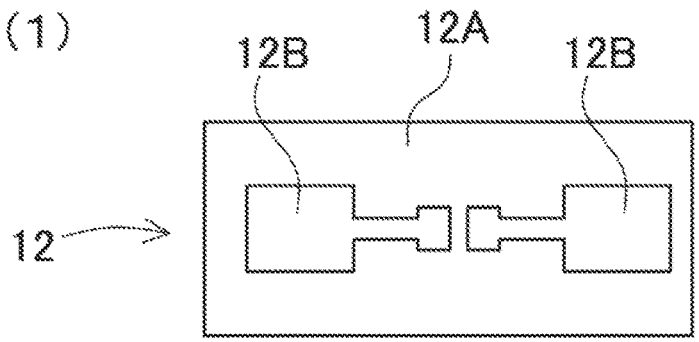
FIG. 9 is plan views illustrating a manufacturing process of the overcurrent protection element illustrated in FIG. 7.
Figure 9:
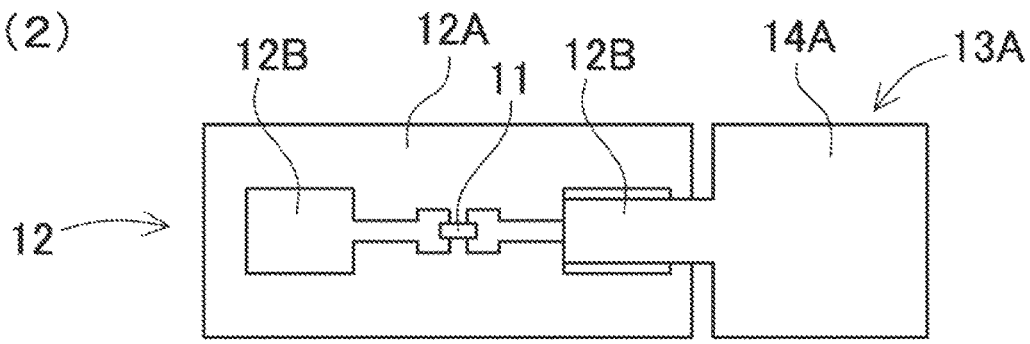
Figure 9:
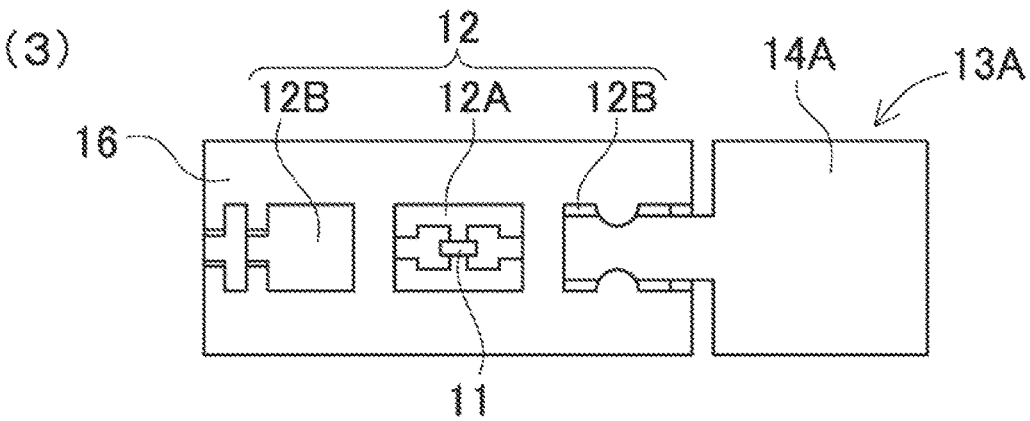
Figure 9:
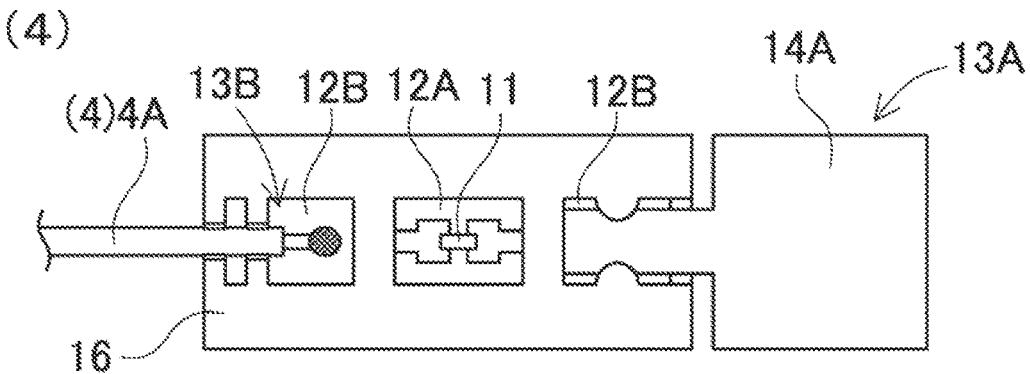

The overcurrent protection element illustrated in FIG. 7 is assembled in a process illustrated in FIG. 9.

As illustrated in a part (1) of FIG. 9, on the surface of insulating substrate 12A, conductive parts 12B are provided to fabricate printed circuit board 12.

As illustrated in a part (2) of FIG. 9, the terminals on both ends of chip fuse 11 are connected to a pair of conductive parts 12B by reflow soldering or the like, and chip fuse 11 is mounted on printed circuit board 12. Moreover, metal plate 14A as first external connection part 13A is connected by soldering to one conductive part 12B of printed circuit board 12.

As illustrated in a part (3) of FIG. 9, insulating plastic molded body 16 is fixed, and the surface of printed circuit board 12 is insulated.

As illustrated in a part (4) of FIG. 9, lead wire 4A is connected by soldering to the surface of second external connection part 13B.

The above indicates the assembly process of overcurrent protection element 30 in FIG. 7. However, the overcurrent protection element can be assembled by connecting the metal plate to the second external connection part by soldering or welding.

Each of overcurrent protection elements 10, 20, 30 described above disposes metal plate 14 serving as external connection part 13 on the outside in the longer direction of rectangular printed circuit board 12, or draws out lead wire 4A, which is to be connected to second external connection part 13B, in the longer direction of printed circuit board 12. The whole of each of overcurrent protection elements 10, 20, 30 with this structure can be formed into an elongated shape and can be disposed in a narrow space. However, as illustrated in FIG. 10, the overcurrent protection element can also draw out metal plate 14 and lead wire 4A in a traverse direction with respect to the longer direction of printed circuit board 12, that is, in a shorter direction, in which metal plate 14 serves as external connection part 13, and lead wire 4A is connected to external connection part 13.

Figure 10:
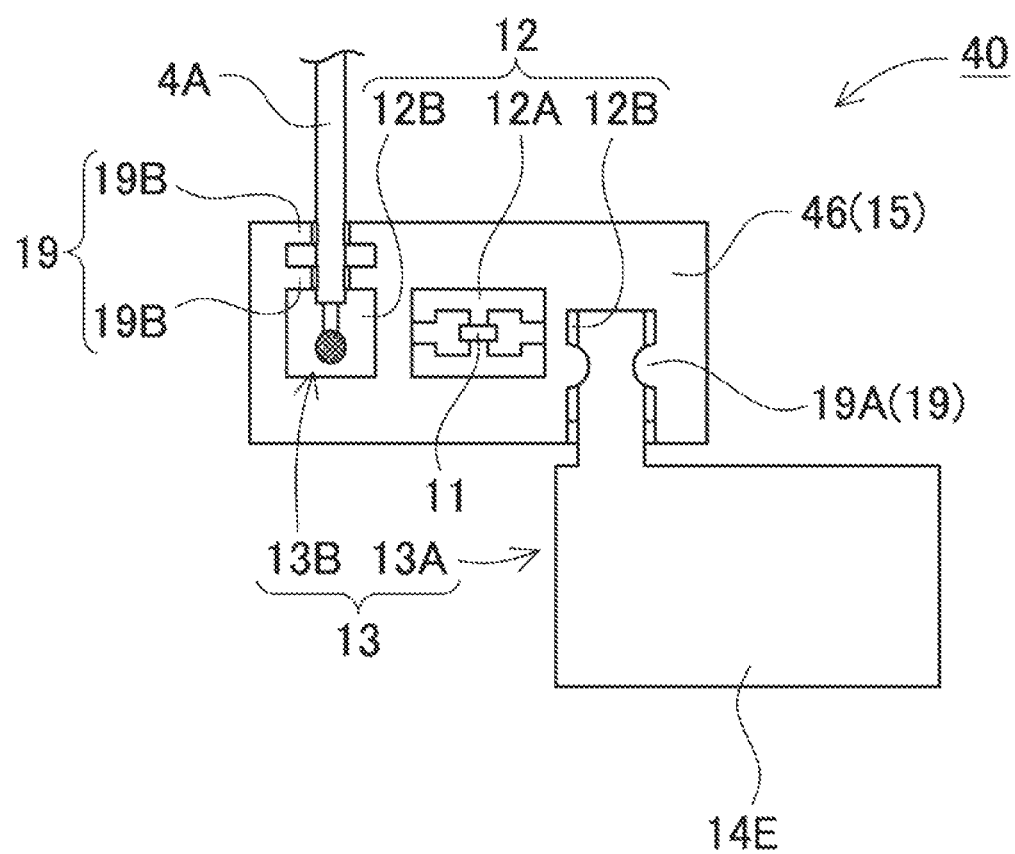
FIG. 10 is a plan view of an overcurrent protection element according to another exemplary embodiment of the present invention.

Overcurrent protection element 40 illustrated in FIG. 10 connects metal plate 14E as first external connection part 13A to rectangular printed circuit board 12 so that metal plate 14E protrudes in the traverse direction with respect to printed circuit board 12. Moreover, overcurrent protection circuit 40 also disposes lead wire 4A to be connected to second external connection part 13B so as to draw out the same in the traverse direction with respect to printed circuit board 12. Hence, insulating plastic molded body 46 that insulates the surface of printed circuit board 12 is provided with holding protrusions 19A, 19B so as to be able to hold metal plate 14E and lead wire 4A, which are to be coupled to printed circuit board 12 in the traverse direction. When the arrangement of the overcurrent protection element is restricted, for example, in such a case where external connection part 13 and lead wire 4A cannot be arranged along a straight line, overcurrent protection element 40 with this structure is selectively used in accordance with usage conditions in that case.

Figure 11:
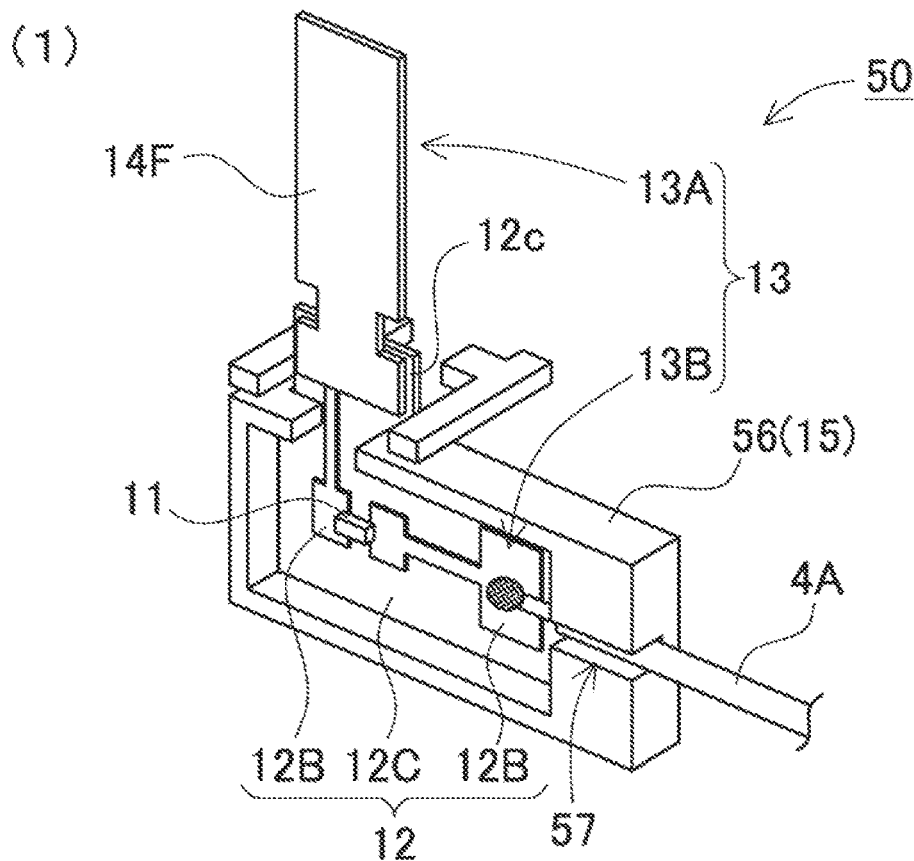
FIG. 11 is perspective views of the overcurrent protection element according to another exemplary embodiment of the present invention.
Figure 11:
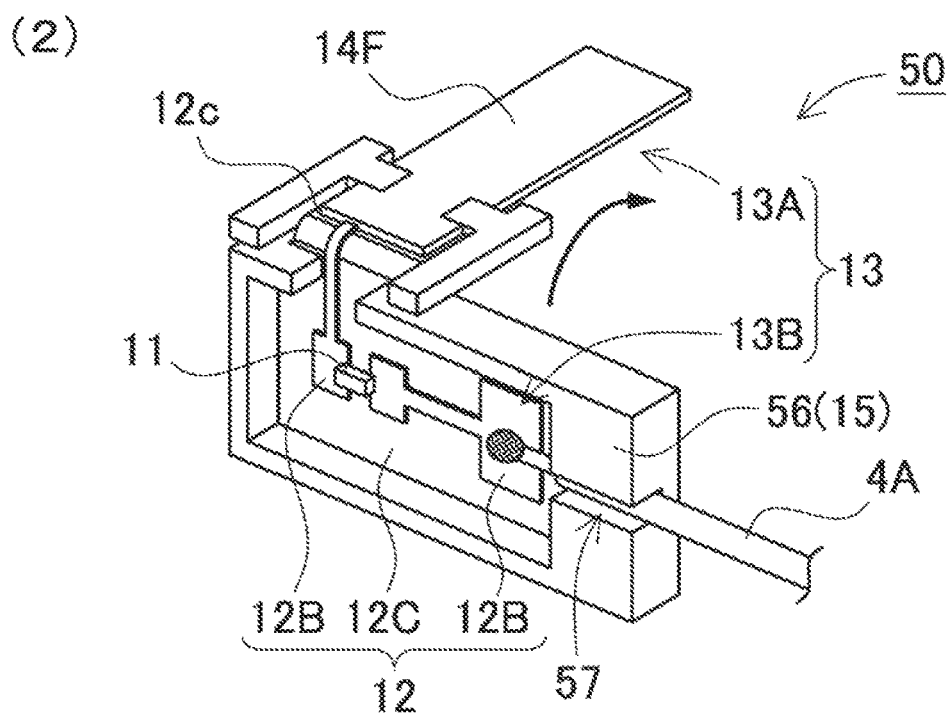
Figure 12:
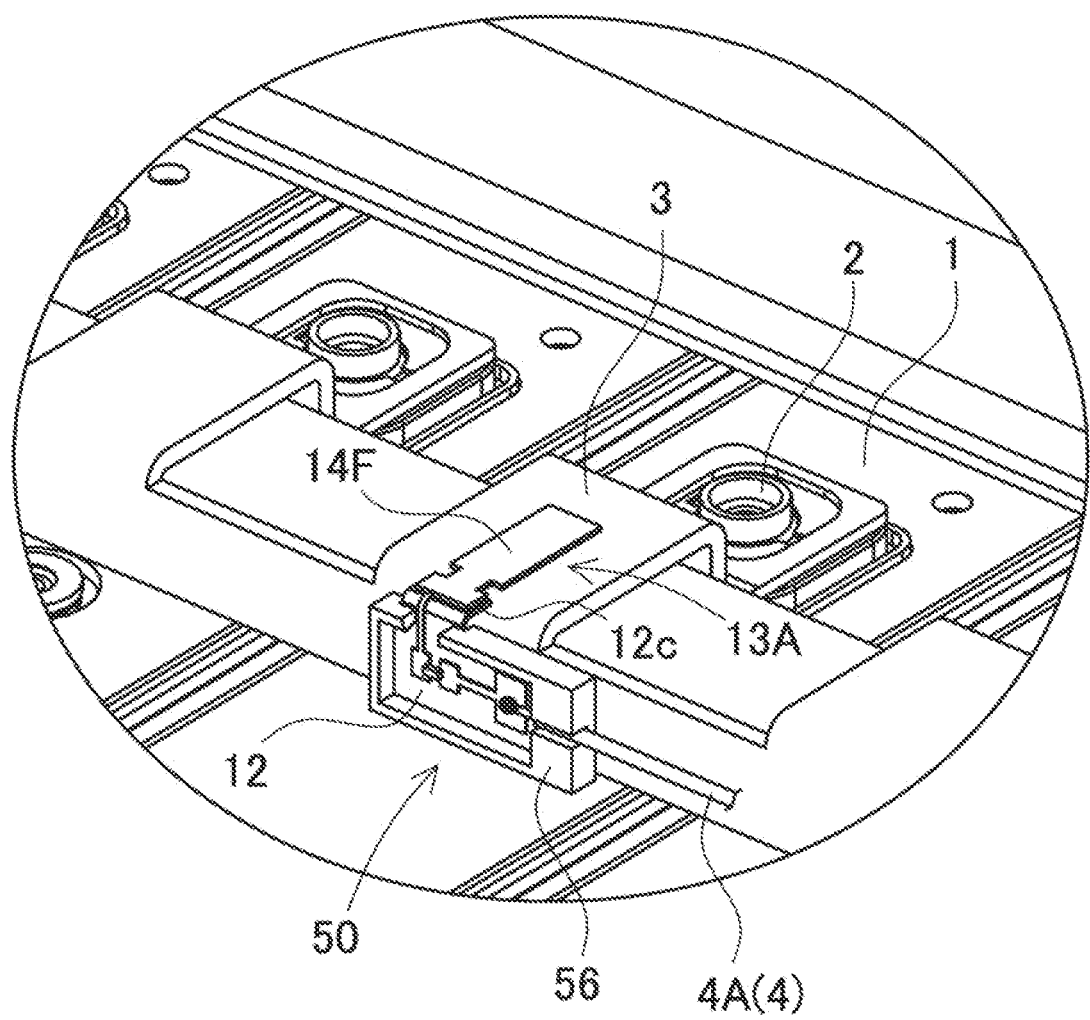
FIG. 12 is a perspective view illustrating one example of a usage state of the overcurrent protection element illustrated in FIG. 11.

Moreover, as illustrated in FIGS. 11 and 12, the overcurrent protection element uses flexible insulating substrate 12C as such an insulating substrate, and can use the insulating substrate by bending. As illustrated in a part (1) of FIG. 11, overcurrent protection element 50 in these drawings provides protruding connection part 12c as a part of insulating substrate 12C and metal plate 14F as first external connection part 13A to be fixed to this protruding connection part 12c so that protruding connection part 12c and metal plate 14F protrude in the traverse direction of rectangular printed circuit board 12. Moreover, overcurrent protection element 50 draws out lead wire 4A, which is to be connected to second external connection part 13B, in the longer direction of printed circuit board 12. Insulating plastic molded body 56 illustrated in the drawings is provided with holding recess 57 for disposing lead wire 4A at a fixed position. As illustrated in a part (2) of FIG. 11, this overcurrent protection element 50 can use flexible insulating substrate 12C by bending the same. As illustrated in FIG. 12, overcurrent protection element 50 with this structure bends protruding connection part 12c that protrudes in the traverse direction of insulating substrate 12C, and connects metal plate 14F as first external connection part 13A to metal plate bus bar 3 connected to electrode terminal 2 of battery cell 1 by welding or soldering. Overcurrent protection element 50 can thus use insulating substrate 12C.

Each of overcurrent protection elements 10, 20, 30, 40, 50 described above laminates and fixes first external connection part 13A onto metal plate bus bar 3 of battery system 100, connects second external connection part 13B to lead wire 4A of voltage detection line 4, and is disposed in the middle of voltage detection line 4. Battery system 100 detects each of the battery voltages by voltage detection line 4 connected to the middle of overcurrent protection element 10, 20, 30, 40, 50, controls the charge/discharge current by control circuit 6 to safely charge/discharge battery cells 1 while protecting respective battery cells 1.

INDUSTRIAL APPLICABILITY

The overcurrent protection element of the present invention is a protection element that is used for a battery system and protects a battery, and is suitably used as a protection element including a fuse that is molten by an excessive current. Moreover, the battery system of the present invention is a battery system including the overcurrent protection element. In particular, the battery system can be suitably used as a power source device that supplies power to a motor that drives an electric vehicle, a power source device of a server, a power source device for a power storage device that stores generated power of a solar cell panel, or a power source device for a power storage device that stores midnight power.

REFERENCE MARKS IN THE DRAWINGS

100: battery system
1: battery cell
2: electrode terminal
3: metal plate bus bar
4: voltage detection line
4A: lead wire
5: voltage detection circuit
6: control circuit
7: connection terminal
10, 20, 30, 40, 50: overcurrent protection element
11: chip fuse
12: printed circuit board
12A, 12C: insulating substrate
12B: conductive part
12c: protruding connection part
13: external connection part
13A: first external connection part
13B: second external connection part
14, 14A, 14B, 14C, 14D, 14E, 14F: metal plate
14a: protrusion
14b: through hole
14c: fitting recess
15: insulating layer
16, 26, 36, 46, 56: insulating plastic molded body
17: opening window
18: locking hook
18A: locking portion
19: holding portion
19A, 19B: holding protrusion
21: insulating material
27: peripheral wall
28: positioning recess
29: fitting protrusion
36A: back cover
36B: insulating cover
36C: hinge portion
57: holding recess

The invention claimed is:

1. An overcurrent protection element comprising:
a chip fuse;
a printed circuit board on which the chip fuse is surface mounted;
an external connection part coupled to the printed circuit board; and
an insulating layer provided on the printed circuit board, wherein
the printed circuit board includes:
an insulating substrate; and
a conductive part on a surface of the insulating substrate,
the external connection part is partially placed on and electrically connected to the conductive part of the printed circuit board,
one end of the external connection part extends out of the printed circuit board,
the chip fuse is surface mounted on and electrically connected to the conductive part, and
the chip fuse is electrically connected to the external connection part via the conductive part;
wherein the insulating layer is an insulating plastic molded body coupled to a surface of the printed circuit board;
wherein the insulating plastic molded body includes an opening window that exposes the chip fuse, and the opening window is covered with an insulating material;
wherein the insulating plastic molded body includes a holding portion of the external connection part;
wherein the holder portion of the external connection parts includes holding protrusions protruding toward each other.

2. The overcurrent protection element according to claim 1, wherein
the insulating substrate is a planar hard substrate.

3. The overcurrent protection element according to claim 1, wherein the insulating substrate is a flexible substrate with flexibility.

4. The overcurrent protection element according to claim 1, wherein
the external connection part includes a pair of a first external connection part and a second external connection part, and
the first external connection part is a metal plate.

5. The overcurrent protection element according to claim 4, wherein
the metal plate includes a shape of a plate to be coupled to a metal plate bus bar fixed to an electrode terminal of each of a plurality of batteries constituting a battery system connecting the batteries in series to one another.

6. The overcurrent protection element according to claim 4, wherein
the second external connection part is a metal plate or a lead wire, the metal plate or the lead wire being soldered to the conductive part of the printed circuit board.

7. The overcurrent protection element according to claim 4, wherein
the second external connection part is a metal plate soldered to the conductive part of the printed circuit board and a lead wire connected to the metal plate.

8. The overcurrent protection element according to claim 1, wherein
the insulating plastic molded body is coupled to the printed circuit board by a locking structure.

9. The overcurrent protection element according to claim 1, wherein
the insulating plastic molded body is fixed by sandwiching both surfaces of the printed circuit board.

10. The overcurrent protection element according to claim 1, wherein
the external connection part is a connection part to be connected to a voltage detection line that detects a voltage of each of a plurality of batteries constituting a battery system connecting the plurality of batteries in series to one another.

11. A battery system comprising:
a plurality of battery cells;
metal plate bus bars fixed to electrode terminals of the plurality of battery cells and connecting the plurality of battery cells to one another; and
a voltage detection circuit connected to the metal plate bus bars via voltage detection lines including overcurrent protection elements, wherein
each of the overcurrent protection elements includes:
a chip fuse;
a printed circuit board on which the chip fuse is surface mounted;
an external connection part coupled to the printed circuit board; and
an insulating layer provided on the printed circuit board,
the printed circuit board is provided with a conductive part on a surface of an insulating substrate,
the external connection part is partially placed on and electrically connected to the conductive part of the printed circuit board,
one end of the external connection part extends out of the printed circuit board
the chip fuse is surface mounted on and electrically connected to the conductive part,
the chip fuse is electrically connected to the external connection part via the conductive part, and
the external connection part is connected to each respective voltage detection line;
wherein the insulating layer is an insulating plastic molded body coupled to a surface of the printed circuit board;
wherein the insulating plastic molded body includes an opening window that exposes the chip fuse, and the opening window is covered with an insulating material;
wherein the insulating plastic molded body includes a holding portion of the external connection part; and
wherein the holder portion of the external connection parts includes holding protrusions protruding toward each other.

12. The battery system according to claim 11, wherein
the insulating substrate is a planar hard substrate or a flexible substrate with flexibility.

13. The battery system according to claim 11, wherein
the insulating layer is an insulating plastic molded body for holding the external connection part.

* * * * *